US008462360B2

(12) United States Patent
Miyazawa et al.

(10) Patent No.: US 8,462,360 B2
(45) Date of Patent: Jun. 11, 2013

(54) NETWORK SYSTEM, PRINTING DEVICE AND PROGRAM FOR SHARING AND HANDLING FONT DATA

(75) Inventors: Masafumi Miyazawa, Aichi (JP); Masaru Yasuda, Aichi (JP); Yasuhiro Kudo, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1422 days.

(21) Appl. No.: 11/699,986

(22) Filed: Jan. 31, 2007

(65) Prior Publication Data

US 2007/0177206 A1 Aug. 2, 2007

(30) Foreign Application Priority Data

Jan. 31, 2006 (JP) .................................. 2006-022545

(51) Int. Cl.
*G06K 15/02* (2006.01)
*G06F 3/12* (2006.01)

(52) U.S. Cl.
USPC .......................... 358/1.11; 358/1.13; 358/1.15

(58) Field of Classification Search
None
See application file for complete search history.

(56) References Cited

U.S. PATENT DOCUMENTS

| 5,167,013 | A * | 11/1992 | Hube et al. ................... 358/1.11 |
| 5,935,262 | A * | 8/1999 | Barrett et al. .................... 714/46 |
| 2003/0043395 | A1* | 3/2003 | Takahashi ..................... 358/1.13 |
| 2003/0178487 | A1* | 9/2003 | Rogers ........................... 235/454 |
| 2004/0179216 | A1* | 9/2004 | Reese et al. ................... 358/1.11 |
| 2005/0068556 | A1* | 3/2005 | Quach et al. .................. 358/1.11 |
| 2007/0074109 | A1* | 3/2007 | Nagahara et al. ............. 715/517 |
| 2007/0195349 | A1* | 8/2007 | Noda ........................... 358/1.11 |

FOREIGN PATENT DOCUMENTS

| JP | 8-329058 A | 12/1996 |
| JP | 11-058872 | 3/1999 |
| JP | 2000-148743 | 5/2000 |
| JP | 2004-142172 | 5/2004 |
| JP | 2005-004362 | 1/2005 |
| JP | 2006-001041 | 1/2006 |
| WO | WO/00/38170 | * 6/2000 |

OTHER PUBLICATIONS

Japanese Notification of Reasons of Rejection, with English Translation, issued in Japanese Patent Application No. JP 2006-022545, dated Mar. 17, 2009. Takamichi Gou, et al. "Network Home appliances—New U.S. National Phase Patent Application Type of Home appliances," Doshisha University Intelligent Systems Design Laboratory, Dec. 1, 2005, <URL:http://mikilab.doshisha.ac.jp/dia/research/report/2005/0905/001/report20050905001.html>, browsed on Jan. 20, 2006.

* cited by examiner

*Primary Examiner* — Ming Hon
(74) *Attorney, Agent, or Firm* — McDermott Will & Emery LLP (57) ABSTRACT

A printing device, to be connected to a network system including network devices sharing image data in a particular format, comprises: a print instruction receiving unit which receives print data containing font information from a network device; a query transmitting unit which transmits a supply query, inquiring whether each network device is capable of supplying a printer font regarding the font information as image data in the particular format, to the network devices; a response receiving unit which receives affirmative responses, indicating that the supply of a printer font regarding the supply query as image data in the particular format is possible, from network devices in response to the supply query; and a printing unit which prints out the print data by use of a printer font held by a network device transmitting the affirmative response as image data in the particular format in response to reception of the affirmative response.

16 Claims, 7 Drawing Sheets

| FILE NAME | CHARACTER CODE | TYPEFACE | BOLDFACE | ITALIC | SIZE |
|---|---|---|---|---|---|
| font_b4c1_gothic_x_x_10pt.bbb | b4c1 | GOTHIC | x | x | 10pt |
| font_b4c1_gothic_x_x_14pt.bbb | b4c1 | GOTHIC | x | x | 14pt |
| font_b4c1_roman_x_x_10pt.bbb | b4c1 | MINCHO | x | x | 10pt |
| font_b4c1_roman_x_x_14pt.bbb | b4c1 | MINCHO | x | x | 14pt |
| font_bbfa_gothic_x_x_10pt.bbb | bbfa | MINCHO | x | x | 10pt |
| font_bbfa_gothic_x_x_14pt.bbb | bbfa | GOTHIC | x | x | 14pt |
| font_bbfa_roman_x_x_10pt.bbb | bbfa | MINCHO | x | x | 10pt |
| font_bbfa_roman_x_x_14pt.bbb | bbfa | MINCHO | x | x | 14pt |
| ... | ... | ... | ... | ... | ... |

FIG. 3

| FILE NAME | CHARACTER CODE | TYPEFACE | BOLDFACE | ITALIC | SIZE |
|---|---|---|---|---|---|
| font_b4c1_brush-style_x_x_24pt.aaa | b4c1 | BRUSH-STYLE | x | x | 24pt |
| font_b4c1_brush-style_x_x_28pt.aaa | b4c1 | BRUSH-STYLE | x | x | 28pt |
| font_bbfa_brush-style_x_x_24pt.aaa | bbfa | BRUSH-STYLE | x | x | 24pt |
| font_bbfa_brush-style_x_x_28pt.aaa | bbfa | BRUSH-STYLE | x | x | 28pt |
| ... | ... | ... | ... | ... | ... |

FIG. 4

| FILE NAME | CHARACTER CODE | TYPEFACE | BOLDFACE | ITALIC | SIZE |
|---|---|---|---|---|---|
| font_b4c1_gothic_x_x_24pt.aaa | b4c1 | GOTHIC | x | x | 24pt |
| font_b4c1_gothic_x_x_28pt.aaa | b4c1 | GOTHIC | x | x | 28pt |
| font_b4c1_gothic_b_x_24pt.aaa | b4c1 | GOTHIC | O | x | 24pt |
| font_b4c1_gothic_b_x_28pt.aaa | b4c1 | GOTHIC | O | x | 28pt |
| font_b4c1_roman_x_x_24pt.aaa | b4c1 | MINCHO | x | x | 24pt |
| font_b4c1_roman_x_x_28pt.aaa | b4c1 | MINCHO | x | x | 28pt |
| font_b4c1_roman_b_x_24pt.aaa | b4c1 | MINCHO | O | x | 24pt |
| font_b4c1_roman_b_x_28pt.aaa | b4c1 | MINCHO | O | x | 28pt |
| font_bbfa_gothic_x_x_24pt.aaa | bbfa | GOTHIC | x | x | 24pt |
| font_bbfa_gothic_x_x_28pt.aaa | bbfa | GOTHIC | x | x | 28pt |
| font_bbfa_gothic_b_x_24pt.aaa | bbfa | GOTHIC | O | x | 24pt |
| font_bbfa_gothic_b_x_28pt.aaa | bbfa | GOTHIC | O | x | 28pt |
| font_bbfa_roman_x_x_24pt.aaa | bbfa | MINCHO | x | x | 24pt |
| font_bbfa_roman_x_x_28pt.aaa | bbfa | MINCHO | x | x | 28pt |
| font_bbfa_roman_b_x_24pt.aaa | bbfa | MINCHO | O | x | 24pt |
| font_bbfa_roman_b_x_28pt.aaa | bbfa | MINCHO | O | x | 28pt |
| ... | ... | ... | ... | ... | ... |

SEARCH QUERY

| fount b4c1_*_*_*_*.aaa |

SEARCH CONTENTS OF
ABOVE SEARCH QUERY

| CHARACTER CODE | TYPEFACE | BOLDFACE | ITALIC | SIZE |
|---|---|---|---|---|
| b4c1 | ANY | ANY | ANY | ANY |

FIG. 7

| FILE NAME |
|---|
| font_b4c1_gothic x x 10pt . aaa |
| font_b4c1_gothic x x 14pt . aaa |
| font_b4c1_roman x x 10pt . aaa |
| font_b4c1_roman x x 14pt . aaa |

FIG. 8

| FILE NAME |
|---|
| font_b4c1_brush-style x x 24pt . aaa |
| font_b4c1_brush-style x x 28pt . aaa |

FIG. 9

| FILE NAME |
|---|
| font_b4c1_gothic x x 24pt . aaa |
| font_b4c1_gothic x x 28pt . aaa |
| font_b4c1_gothic b x 24pt . aaa |
| font_b4c1_gothic b x 28pt . aaa |
| font_b4c1_roman x x 24pt . aaa |
| font_b4c1_roman x x 28pt . aaa |
| font_b4c1_roman b x 24pt . aaa |
| font_b4c1_roman b x 28pt . aaa |

| FILE NAME | CHARACTER CODE | TYPEFACE | BOLDFACE | ITALIC | SIZE |
|---|---|---|---|---|---|
| font_b4c1_gothic x x 10pt . aaa | b4c1 | GOTHIC | X | X | 10pt |
| font_b4c1_gothic x x 14pt . aaa | b4c1 | GOTHIC | X | X | 14pt |
| font_bbfa_gothic x x 10pt . aaa | bbfa | GOTHIC | X | X | 10pt |
| font_bbfa_gothic x x 14pt . aaa | bbfa | GOTHIC | X | X | 14pt |
| ... | ... | ... | ... | ... | ... |

FIG.13

| FILE NAME |
|---|
| font_b4c1_gothic x x 10pt . aaa |
| font_b4c1_gothic x x 14pt . aaa |

NETWORK SYSTEM, PRINTING DEVICE AND PROGRAM FOR SHARING AND HANDLING FONT DATA

CROSS-REFERENCE TO RELATED APPLICATION

This application claims priority under 35 U.S.C. §119 from Japanese Patent Application No. 2006-022545, filed on Jan. 31, 2006. The entire subject matter of the application is incorporated herein by reference.

BACKGROUND

1. Technical Field

Aspects of the present invention relate to a network system in which a plurality of network devices are connected together to be capable of communicating with one another and the network devices are capable of sharing and handling image data in a particular format held by at least one of the network devices.

2. Related Art

A great number of network systems have been constructed in recent years for various purposes and in various configurations. For example, there has been proposed a network system interconnecting a plurality of electrical home appliances by a LAN (Local Area Network) and sharing image data in a particular format among the appliances, as described in Takamichi Gou, et al. "Network Home appliances—New Type of Home appliances", Doshisha University Intelligent Systems Design Laboratory (Dec. 1, 2005) on the Internet <URL: http://mikilab.doshisha.ac.jp/dia/research/report/2005/0905/001/report20050905001.html> (browsed on Jan. 20, 2006).

In a technique proposed in Japanese Patent Provisional Publication No. HEI 08-329058 (hereinafter referred to as JP HEI 8-329058A), when a printer font not stored in a network-compatible printing device is designated by print data that is transmitted from a network device to the printing device via a network (in a network system including network devices and the printing device connected together by the network to communicate data), the printing device transmits a query to a font server in which all printer fonts to be used by the network devices on the network have been registered, receives a printer font corresponding to the printer font specified by the query, and executes the printing of the print data by use of the received printer font.

Numbers of technical proposals are being made in regard to network systems as mentioned above with the rapid progress and expansion of system networking in recent years. Consequently, vast amounts of information, which used to be printed on print media such as paper and managed in the form of print media, are stored in network devices forming a network system as electronic data in a prescribed format, and any user of a network device sharing the network system is capable of handling such data stored in other network devices as shared data at any time.

However, when such a user actually uses such data electronically managed in the network system, the user in many cases uses the information represented by the data by printing out the information as in the past, not by viewing the information displayed on a display screen, etc.

According to the above technique of JP HEI 8-329058A, even when the printing device does not have a printer font specified by font information contained in print data (object of printing), a font server can be provided independently of the network system (for example, provided exclusively for the printing device so as to communicate with the printing device only) and the printing device can carry out the printing of the print data by use of a printer font held by the font server.

However, implementation of the above technique requires that a font server should be provided specially, for which modification of the already-constructed network system becomes necessary.

SUMMARY

Aspects of the present invention are advantageous in that a network system, capable of letting a printing device of the system execute appropriate printing according to font information contained in print data (print instruction) issued by a network device in the system even when a printer font not held by the printing device is specified by the font information, can be provided without the need of modifying the configuration of an already-constructed network system.

BRIEF DESCRIPTION OF THE ACCOMPANYING DRAWINGS

FIG. 2 is a table for explaining printer fonts stored in a flash memory of an MFP (Multi Function Peripheral) included in the network system.

FIG. 3 is a table for explaining printer fonts stored in an optical medium that is detachably set in an optical media playback device included in the network system.

FIG. 4 is a table for explaining printer fonts stored in an HDD of each PC included in the network system.

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

In a network system (in which a plurality of network devices including a printing device are connected together to be able to communicated with one another) in accordance with the present invention which has been made in consideration of the above problems, the network devices are capable of sharing and handling image data in a particular format held by at least one of the network devices and are also capable of issuing print instructions (print data) to the printing device. The printing device receiving the print instruction (print data) is capable of printing out the received print data by use of a printer font that can be supplied by a network device as image data in the particular format.

In accordance with an aspect of the present invention, there is provided a network system in which a plurality of network devices including a printing device are connected together to be capable of communicating with one another and the network devices are capable of sharing and handling image data in a particular format held by at least one of the network devices, having the following configuration: In the network system, the printing device includes: a print instruction receiving unit configured to receive print data containing font information from another network device; a query transmitting unit configured to transmit a supply query, inquiring whether or not each network device is capable of supplying a printer font regarding the font information contained in the print data as image data in the particular format, to other network devices; a response receiving unit configured to receive affirmative responses, indicating that the supply of the printer font regarding the supply query as image data in the particular format is possible, transmitted from other network devices in response to the transmission of the supply query by the query transmitting unit; and a printing unit configured to print out the print data received by the print instruction receiving unit by use of the printer font held by a network device, which is one of the other network devices and transmits the affirmative response, as image data in the particular format in response to reception of the affirmative response by the response receiving unit. At least one of the network devices includes: a query receiving unit configured to receive the supply query transmitted from the printing device; a font supply judgment unit configured to judge whether the network device is capable of supplying a printer font regarding the supply query as image data in the particular format or not in response to reception of the supply query by the query receiving unit; and a response transmitting unit configured to transmit the affirmative response to the printing device in response to judgment by the font supply judgment unit that the network device is capable of supplying a printer font regarding the supply query as image data in the particular format.

With this configuration, a network system capable of producing an appropriate printout according to the font information contained in the print data (specifically, producing a printout that is the most approximate to the requested style while preventing printing of characters unrecognizable to the user) can be realized without the need of changing the configuration of a network system in which a plurality of network devices including a printing device are connected together to be able to communicate with one another and to share and handle image data in a particular format.

In the network system, the printing device can execute appropriate printing even for printer fonts not held by itself while handling necessary printer fonts as data in the particular format that can be shared and handled in the network system.

Incidentally, the "printer font regarding the font information contained in the print data" in this configuration is not restricted to a printer font perfectly matching the font information contained in the print data (ditto for other configurations described below).

The "printer font held by the network device transmitting the affirmative response as image data in the particular format" in this configuration is not restricted to printer fonts currently held by the network device transmitting the affirmative response but can include printer fonts that can be supplied by the network device to the printing device as image data in the particular format (and held by the printing device at the point of the printing) for the printing by the printing device (ditto for other configurations described below).

In at least one aspect, the printing device further includes: a font storage unit configured to store printer fonts as image data in the particular format; and a font storage judgment unit configured to judge whether or not the font storage unit has stored a printer font regarding the font information contained in the print data received by the print instruction receiving unit. The query transmitting unit of the printing device transmits the supply query in response to judgment by the font storage judgment unit that the font storage unit has stored no printer font regarding the font information contained in the print data.

With this configuration, transmission of too many supply queries on the network can be prevented and a network system capable of suppressing the increase in the amount of data (packets) transmitted on the network (i.e. a network system considering the network traffic problem) can be realized.

In at least one aspect, at least one of the network devices in the network system further includes a font readout unit capable of reading out printer fonts stored in a storage medium removable from the network device as image data in the particular format. The font supply judgment unit of the network device judges that the network device is capable of supplying a printer font regarding the supply query as image data in the particular format if the font readout unit can read out a printer font regarding the supply query that has been stored in the removable storage medium as image data in the particular format.

With this configuration, any network device having the font readout unit can be used as a device capable of supplying necessary printer fonts to the printing device, by letting the network device read out the printer fonts stored in a removable storage medium.

In at least one aspect, the printing device further includes: a font storage unit which stores printer fonts as image data in the particular format; and a font storage judgment unit which judges whether or not the font storage unit has stored a printer font exactly matching the font information contained in the print data received by the print instruction receiving unit. The query transmitting unit of the printing device transmits the supply query in response to judgment by the font storage judgment unit that the font storage unit has not stored a printer font exactly matching the font information contained in the print data. The printing unit of the printing device executes the printing of the print data received by the print instruction receiving unit by use of the printer font exactly matching the font information when the font storage judgment unit judges that the font storage unit has stored the printer font exactly matching the font information while executing the printing by use of a printer font selected from the printer fonts stored in the font storage unit and printer fonts held by the network devices transmitting the affirmative responses as image data in the particular format when the font storage judgment unit judges that the font storage unit has not stored the printer font exactly matching the font information.

With this configuration, the transmission of the supply query to other network devices can be left out when the font storage unit has stored a printer font exactly matching the font information, by which the increase in the network traffic can be avoided. When the font storage unit has not stored the printer font exactly matching the font information, the printing of the print data can be executed by use of a printer font properly selected from the printer fonts stored in the font storage unit and printer fonts held by the network devices transmitting the affirmative responses as image data in the particular format, by which a printout highly approximate to the requested style can be obtained.

In at least one aspect, the font supply judgment unit of the network device generates a list of printer fonts regarding the supply query that the network device is capable of supplying to the printing device as image data in the particular format when the supply of at least one such printer font is possible. The response transmitting unit of the network device transmits the list generated by the font supply judgment unit to the printing device together with the affirmative response. The printing device further includes a font selection unit configured to select a printer font to be used for the printing of the print data by the printing unit taking the lists transmitted from other network devices into consideration. The printing unit of the printing device executes the printing of the print data received by the print instruction receiving unit by use of the printer font selected by the font selection unit.

With this configuration, a printout highly approximate to the requested style can be obtained thanks to the printer font selection by the font selection unit taking the lists from other network devices (transmitting the affirmative responses) into consideration.

In at least one aspect, the printing device further comprises a network device information storage unit configured to store network device information indicating whether each of the network devices in the network system holds image data as printer fonts or not. The query transmitting unit of the printing device transmits the supply query only to network devices holding image data as printer fonts based on the network device information stored in the network device information storage unit.

With this configuration, transmission of the supply query to network devices not holding image data as printer fonts can be avoided, by which unnecessary data (packet) transmission in the network system can be eliminated and the traffic load on the network system can be reduced.

According to another aspect of the invention, there is provided a network system in which a plurality of network devices including a printing device are connected together to be capable of communicating with one another. The printing device comprises a print instruction receiving unit configured to receive print data containing font information from another network device; a query transmitting unit configured to transmit a supply query, inquiring whether or not each network device is capable of supplying a printer font regarding the font information contained in the print data as image data in the particular format, to other network devices; a response receiving unit configured to receive responses transmitted from the other network devices in response to transmission of the supply query by the query transmitting unit; and a printing unit configured to print out the print data received by the print instruction receiving unit by use of a printer font held by a network device, which is one of the other network devices and transmits an affirmative response, as image data in the particular format in response to reception of the affirmative response by the response receiving unit. At least one of the network devices comprises: a query receiving unit configured to receive the supply query transmitted from the printing device; a font supply judgment unit configured to judge whether the network device is capable of supplying a printer font regarding the supply query as image data in the particular format or not in response to reception of the supply query by the query receiving unit; and a response transmitting unit configured to transmit the response to the printing device in response to judgment by the font supply judgment unit.

With this configuration, a network system capable of producing an appropriate printout according to the font information contained in the print data (specifically, producing a printout that is the most approximate to the requested style while preventing printing of characters unrecognizable to the user) can be realized without the need of changing the configuration of a network system in which a plurality of network devices including a printing device are connected together to be able to communicate with one another and to share and handle image data in a particular format.

In accordance with another aspect of the present invention, there is provided a printing device to be connected to a network system, in which a plurality of network devices are connected together and the network devices are capable of sharing and handling image data in a particular format held by at least one of the network devices, to be capable of communicating with the network devices. The printing device comprises: a print instruction receiving unit configured to receive print data containing font information from a network device; a query transmitting unit configured to transmit a supply query, inquiring whether or not each network device is capable of supplying a printer font regarding the font information contained in the print data as image data in the particular format, to the network devices; a response receiving unit configured to receive affirmative responses, indicating that the supply of a printer font regarding the supply query as image data in the particular format is possible, transmitted from network devices in response to the supply query transmitted by the query transmitting unit; and a printing unit configured to print out the print data received by the print instruction receiving unit by use of a printer font held by a network device transmitting the affirmative response as image data in the particular format in response to reception of the affirmative response by the response receiving unit.

With this configuration, a printing device forming the network system described above can be provided. Specifically, the printing device configured as above is capable of executing appropriate printing even for printer fonts not held by itself while handling necessary printer fonts as data in the particular format that can be shared and handled in the network system.

In at least one aspect, the printing device further comprises: a font storage unit configured to store printer fonts as image data in the particular format; and a font storage judgment unit configured to judge whether or not the font storage unit has stored a printer font regarding the font information contained in the print data received by the print instruction receiving unit. The query transmitting unit transmits the supply query in response to judgment by the font storage judgment unit that the font storage unit has stored no printer font regarding the font information contained in the print data.

With this configuration, transmission of too many supply queries on the network can be prevented and a network system capable of suppressing the increase in the amount of data (packets) transmitted on the network (i.e. a network system considering the network traffic problem) can be realized.

In at least one aspect, the printing device further comprises: a font storage unit configured to store printer fonts as image data in the particular format; and a font storage judgment unit configured to judge whether or not the font storage unit has stored a printer font exactly matching the font information contained in the print data received by the print instruction receiving unit. The query transmitting unit transmits the supply query in response to judgment by the font storage judgment unit that the font storage unit has not stored a printer font exactly matching the font information contained in the print data. The printing unit executes the printing of the print data received by the print instruction receiving unit by use of the printer font exactly matching the font information when the font storage judgment unit judges that the font storage unit has stored the printer font exactly matching the font information while executing the printing by use of a printer font selected from the printer fonts stored in the font storage unit and printer fonts held by the network devices transmitting the affirmative responses as image data in the particular format when the font storage judgment unit judges that the font storage unit has not stored the printer font exactly matching the font information.

With this configuration, the transmission of the supply query to the network devices can be left out when the font storage unit has stored a printer font exactly matching the font information, by which the increase in the network traffic can be avoided. When the font storage unit has not stored the printer font exactly matching the font information, the printing of the print data can be executed by use of a printer font properly selected from the printer fonts stored in the font storage unit and printer fonts held by the network devices transmitting the affirmative responses as image data in the particular format, by which a printout highly approximate to the requested style can be obtained.

In at least one aspect, the response receiving unit receives a list, indicating printer fonts regarding the supply query that each network device is capable of supplying to the printing device as image data in the particular format, from each network device transmitting the affirmative response. The printing device further comprises a font selection unit configured to select a printer font to be used for the printing of the print data by the printing unit taking the lists transmitted from network devices into consideration. The printing unit executes the printing of the print data received by the print instruction receiving unit by use of the printer font selected by the font selection unit.

With this configuration, a printout highly approximate to the requested style can be obtained thanks to the printer font selection by the font selection unit taking the lists from network devices (transmitting the affirmative responses) into consideration.

In at least one aspect, the printing device further comprises a network device information storage unit configured to store network device information indicating whether each of the network devices in the network system holds image data as printer fonts or not. The query transmitting unit transmits the supply query only to network devices holding image data as printer fonts based on the network device information stored in the network device information storage unit.

With this configuration, transmission of the supply query to network devices not holding image data as printer fonts can be avoided, by which unnecessary data (packet) transmission in the network system can be eliminated and the traffic load on the network system can be reduced.

In at least one aspect, the printing device further comprises: a font storage unit configured to store printer fonts as image data in the particular format; a query receiving unit configured to receive the supply query transmitted from another printing device connected to the network system; a font supply judgment unit configured to judge whether the font storage unit is capable of supplying a printer font regarding the supply query as image data in the particular format or not in response to reception of the supply query by the query receiving unit; and a response transmitting unit configured to transmit the affirmative response to the printing device transmitting the supply query in response to judgment by the font supply judgment unit that the font storage unit is capable of supplying a printer font regarding the supply query as image data in the particular format.

With this configuration, the printing device is capable of not only executing its own printing tasks excellently as above but also enabling other printing devices to execute appropriate printing even for printer fonts not held by themselves while handling necessary printer fonts as data in the particular format that can be shared and handled in the network system. In other words, a printing device, capable of functioning as the aforementioned "network device" (supplying printer fonts as in the network system described first) for other printing devices while implementing the functions of the aforementioned "printing device" (executing appropriate printing even for printer fonts not held by itself), can be provided.

In accordance with another aspect of the present invention, there is provided a printing device to form a network system in which a plurality of network devices are connected together and the network devices are capable of sharing and handling image data in a particular format held by at least one of the network devices, receive print data containing font information transmitted from a network device in the network system, and execute printing according to the print data. The printing device comprises: a font storage unit configured to store printer fonts as image data in the particular format; a query receiving unit configured to receive a supply query, inquiring whether or not the printing device is capable of supplying a printer font regarding the font information contained in the print data as image data in the particular format, transmitted from another printing device receiving the print data; a font supply judgment unit configured to judge whether the font storage unit is capable of supplying a printer font regarding the supply query as image data in the particular format or not in response to reception of the supply query by the query receiving unit; and a response transmitting unit configured to transmit an affirmative response, indicating that the supply of a printer font regarding the supply query as image data in the particular format is possible, to the printing device transmitting the supply query in response to judgment by the font supply judgment unit that the font storage unit is capable of supplying a printer font regarding the supply query as image data in the particular format.

With this configuration, the printing device is capable of enabling other printing devices to execute appropriate printing even for printer fonts not held by themselves while handling necessary printer fonts as data in the particular format that can be shared and handled in the network system. In other words, a printing device, also having the functions of the aforementioned "network device" (supplying printer fonts as in the network system described first) for other printing devices, can be provided.

In accordance with another aspect of the present invention, there is provided a computer readable medium having computer readable instructions stored thereon, which, when executed by a computer functioning as a printing device connected to a network system in which a plurality of network devices are connected together and the network devices are capable of sharing and handling image data in a particular format held by at least one of the network devices, are configured to receive print data containing font information from a network device in the network system; to transmit a supply query, inquiring whether or not each network device is capable of supplying a printer font regarding the font information contained in the print data as image data in the particular format, to the network devices; to receive affirmative responses, indicating that the supply of a printer font regarding the supply query as image data in the particular format is possible, transmitted from network devices in response to the transmitted supply query; and to control the printing device to let the printing device print out the received print data by use of a printer font held by a network device transmitting the affirmative response as image data in the particular format in response to reception of the affirmative response.

With this computer readable medium, the printing device can be controlled to be capable of executing appropriate printing even for printer fonts not held by itself while handling necessary printer fonts as data in the particular format that can be shared and handled in the network system.

In accordance with another aspect of the present invention, there is provided a computer readable medium having computer readable instructions stored thereon, which, when executed by a computer functioning as a printing device which forms a network system in which a plurality of network devices are connected together and the network devices are capable of sharing and handling image data in a particular format held by at least one of the network devices and includes a font storage unit storing printer fonts as image data in the particular format, are configured to receive a supply query, inquiring whether or not the printing device is capable of supplying a printer font regarding font information contained in print data as image data in the particular format, transmitted from another printing device receiving the print data; to judge whether the font storage unit is capable of supplying a printer font regarding the supply query as image data in the particular format or not in response to reception of the supply query; and to transmit an affirmative response, indicating that the supply of a printer font regarding the supply query as image data in the particular format is possible, to the printing device transmitting the supply query in response to judgment that the font storage unit is capable of supplying a printer font regarding the supply query as image data in the particular format.

With this computer readable medium, the printing device can be controlled to be capable of enabling other printing devices to execute appropriate printing even for printer fonts not held by themselves while handling necessary printer fonts as data in the particular format that can be shared and handled in the network system.

EMBODIMENT

Referring now to the drawings, a description will be given in detail of preferred embodiments in accordance with the present invention. Incidentally, the present invention is not to be restricted by particular illustrative configurations described below but can employ various other configurations based on the same technical idea.

First Embodiment

Figure 1:
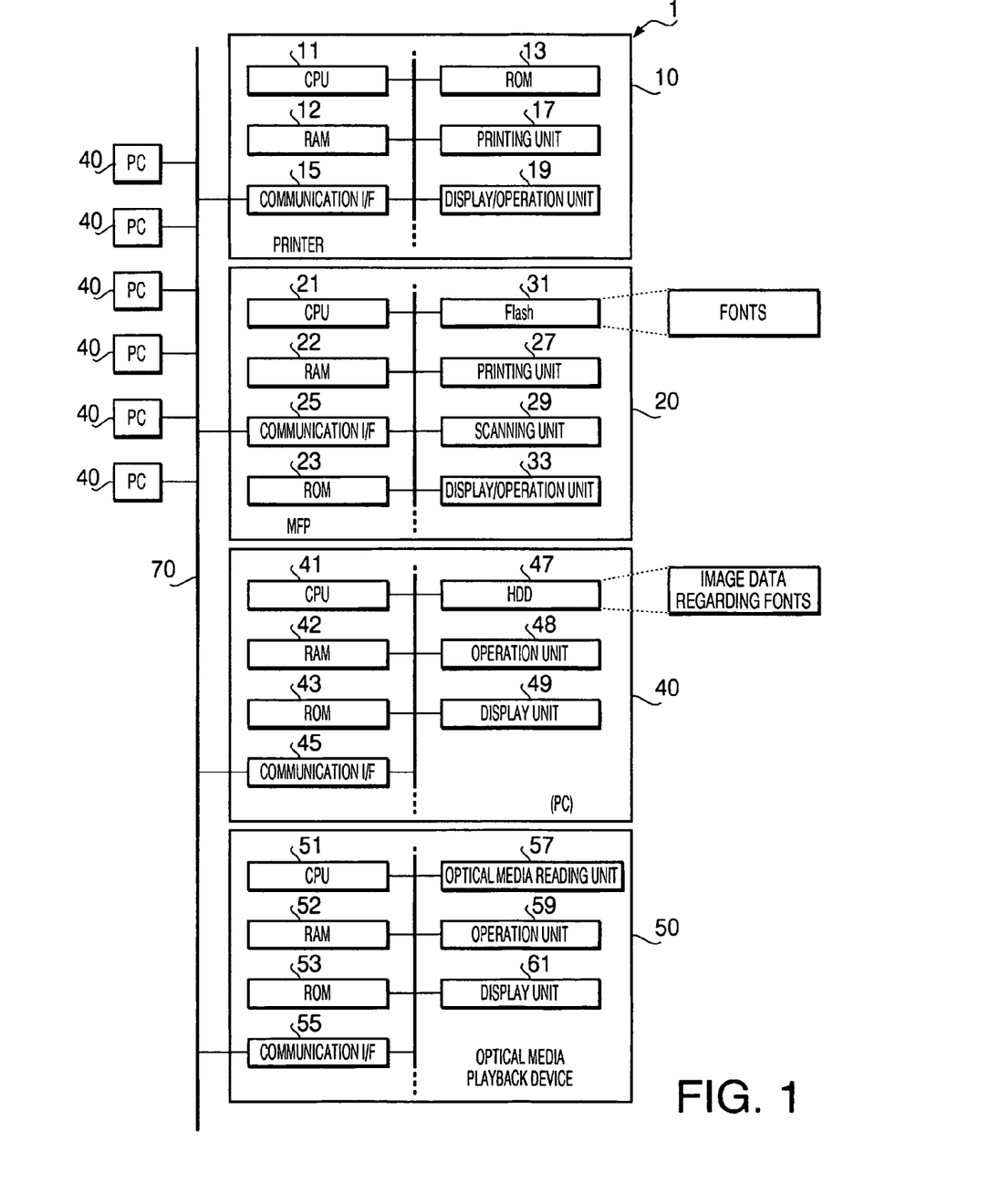
FIG. 1 is a block diagram showing a network system in accordance with a first embodiment of the present invention.

FIG. 1 is a block diagram showing a network system 1 in accordance with a first embodiment of the present invention. The network system 1 of FIG. 1 includes a printer 10 having a printing function only, an MFP (Multi Function Peripheral) 20 having the printing function, a scanner function and other functions, PCs (Personal Computers) 40 issuing print instructions by transmitting print data to the printer 10 or the MFP 20, and an optical media playback device 50 capable of reading out data from an optical medium and reproducing information from the data. The printer 10, the MFP 20, the PCs 40 and the optical media playback device 50 are connected together by a LAN (Local Area Network) 70 to communicate data with one another. Incidentally, while the network system 1 includes only one printer 10 in the example of FIG. 1, two or more printers 10 may•be included in the network system 1 (ditto for the MFP 20 and the optical media playback device 50).

The printer 10 includes a CPU (Central Processing Unit) 11, a RAM (Random Access Memory) 12, a ROM (Read Only Memory) 13, a communication I/F (interface) 15, a printing unit 17 and a display/operation unit 19. The CPU 11, the RAM 12 and the ROM 13 form a control unit of the printer 10. The communication I/F 15 is directly connected to the LAN 70 for the communication of data via the LAN 70. The display/operation unit 19 displays prescribed information regarding the printer 10 and receives instructions inputted by the user to the printer 10. Differently from the MFP 20 which will be explained below, the printer 10 does not hold (or store, ditto for the following description) printer fonts to be used for the printing of print data by the printing unit 17.

The MFP 20 includes a CPU 21, a RAM 22, a ROM 23, a communication I/F 25, a printing unit 27, a scanning unit 29, a flash memory 31 and a display/operation unit 33. The CPU 21, the RAM 22 and the ROM 23 form a control unit of the MFP 20. The communication I/F 25 is directly connected to the LAN 70 for the communication of data via the LAN 70. The scanning unit 29 is a unit implementing the scanner function. The flash memory 31 stores printer fonts ("FONTS" in FIG. 1) to be used for the printing of print data by the printing unit 27. The display/operation unit 33 displays prescribed information regarding the MFP 20 and receives instructions inputted by the user to the MFP 20.

Incidentally, the printer fonts stored in the flash memory 31 of the MFP 20 are those stored in a special-purpose format (not image data in a particular format that can be shared and handled in the network system 1). The MFP 20 is capable of converting the printer fonts stored in the flash memory 31 to image data that can be shared and handled in the network system 1. The conversion is made by the CPU 21 according to a conversion program stored in the ROM 23.

The optical media playback device 50 includes a CPU 51, a RAM 52, a ROM 53, a communication I/F 55, an optical media reading unit 57, an operation unit 59 and a display unit 61. The CPU 51, the RAM 52 and the ROM 53 form a control unit of the optical media playback device 50. The communication I/F 55 is directly connected to the LAN 70 for the communication of data via the LAN 70. The optical media reading unit 57 is capable of reading out data (video data, music (audio) data, still image data, etc.) that have been stored in optical media in particular formats. The operation unit 59 receives instructions inputted by the user to the optical media playback device 50. The display unit 61 displays prescribed information. Incidentally, the optical media reading unit 57 is capable of reading out printer fonts which will be explained later ("IMAGE DATA REGARDING FONTS" in FIG. 1) from optical media storing the printer fonts.

Each PC 40 includes a CPU 41, a RAM 42, a ROM 43, a communication I/F 45, an HDD (Hard Disk Drive) 47, an operation unit 48 and a display unit 49 as shown in FIG. 1. The ROM 13, 23, 43, 53 of each device 10, 20, 40, 50 stores programs for executing various processes (including a process described later). The CPUs 11, 21, 41 and 51 of the devices 10, 20, 40 and 50 execute the processes according to the programs.

FIG. 2 is a table for explaining the printer fonts stored in the flash memory 31 of the MFP 20. FIG. 3 is a table for explaining the printer fonts stored in an optical medium that is removably set in the optical media reading unit 57 of the optical media playback device 50. FIG. 4 is a table for explaining the printer fonts stored in the HDD 47 of each PC 40. Incidentally, the printer fonts shown in FIGS. 3 and 4 are image data (representing the printer fonts) that have been stored in the optical medium and the HDD 47 in a particular format that can be shared and handled in the network system 1.

In FIGS. 2-4, each "FILE NAME" is identification information that has been assigned to each printer font (image data). For example, the name "font_b4c1_gothic_x_x_10pt.bbb" of a file stored in the flash memory 31 of the MFP 20 represents data in a format specified by a filename extension "bbb", as a printer font of a character that is specified by a character code "b4c1", in the Gothic type, and in the 10 point size. Incidentally, this particular printer font is not enhanced in boldface or italics (oblique face) since the two elements "x" in each file name in FIGS. 2-4 indicate that each printer font is not in boldface or italics.

Meanwhile, the name "font_b4c1_gothic_x_x_24pt.aaa" of a file stored in the HDD 47 of each PC 40 represents image data in a format specified by a filename extension "aaa", as a printer font of a character that is specified by the character code "b4c1", in the Gothic type, in the 24 point size, and not in boldface or italics.

Explanation of the other printer fonts in FIGS. 2-4 are omitted here since the other file names in the figures are described according to the same rule as the above file names.

The printer fonts shown in FIGS. 2, 3 and 4 have been stored in the flash memory 31 of the MFP 20 (see FIG. 1), the optical medium (unshown in FIG. 1) set in the optical media reading unit 57 of the optical media playback device 50 (see FIG. 1), and the HDD 47 of each PC 40 (see FIG. 1), respectively. Incidentally, the printer fonts shown in FIGS. 2-4 are just an example, and thus other printer fonts unshown in FIGS. 2-4 have also been stored in the three storage media.

A process which is executed by the network system 1 configured as above will be explained below referring to FIGS. 5-11. The following explanation will be given assuming that a print instruction for printing two "kanji characters" (characters used in Japan that are similar to Chinese characters) specified by character codes "b4c1" and "bbfa", in a typeface "brush-style", in the character size 30 pt, and not in boldface or italics (specified by the two file name elements "x") is transmitted as print data from a PC 40 to the printer 10 and the print data is printed out by the printer 10.

Figure 5:
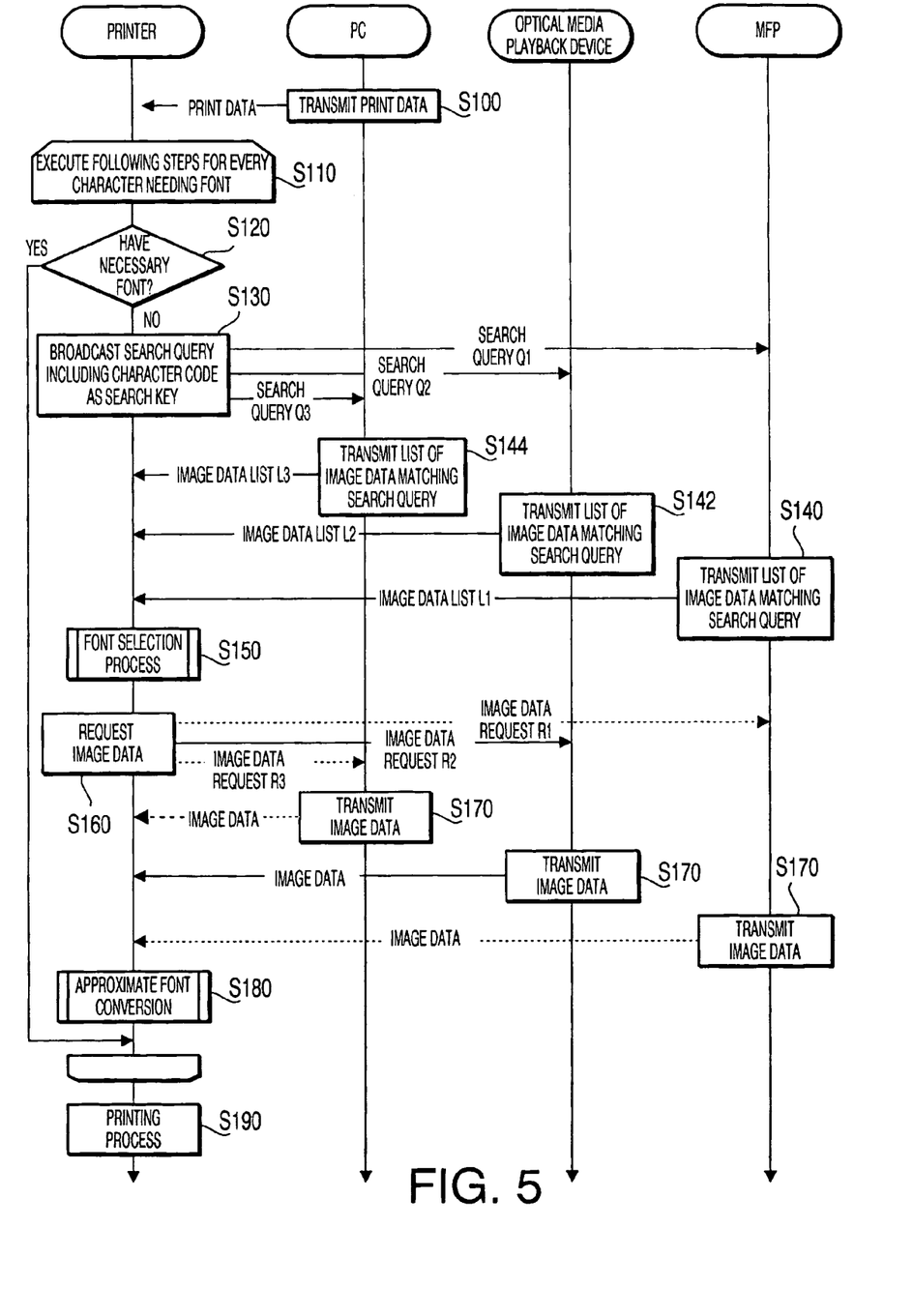
FIG. 5 is a schematic diagram showing a process executed by the network system of FIG. 1.

First, the PC 40 transmits the print data to the printer 10 (S100 in FIG. 5). The printer 10 receiving the print data identifies characters that need printer fonts ("FONTS" in FIG. 5) based on the print data, and executes the following process for each of the characters needing printer fonts. In this embodiment, the characters needing printer fonts in step S110 are the two kanji characters specified by the character codes "b4c1" and "bbfa" since the two kanji characters are designated by the print data (print instruction).

In step S120, the printer 10 judges whether the printer 10 itself has (i.e. holds) the printer fonts for the two kanji characters identified in the step S110 or not based on the character codes "b4c1" and "bbfa". If the printer 10 has the printer fonts (S120: YES), the printer 10 executes a printing process regarding the print data by use of the printer fonts held by itself (S190). If the printer 10 does not have the printer fonts (S120: NO), the printer 10 advances to step S130.

The judgment of S120 results in "NO" in the first embodiment since the printer 10 in the first embodiment has no printer fonts as mentioned above. In such a configuration in which the printer 10 has no printer fonts, the judgment step S120 can also be left out, by which the processing speed can be increased. In the step S130, the printer 10 broadcasts a search query, including each of the character codes "b4c1" and "bbfa" as a search key, to all the devices connected to the network system 1 via the LAN 70.

Figure 6:
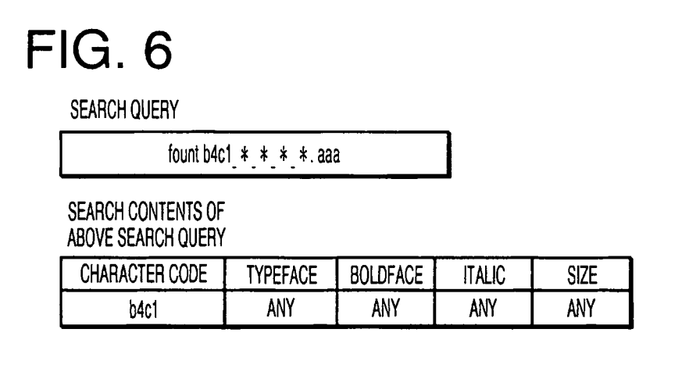
FIG. 6 is a schematic diagram for explaining a search query transmitted by a printer included in the network system.
Figure 7:
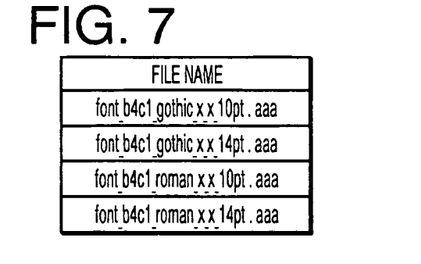
FIG. 7 is a table showing an image data list transmitted by the MFP.
Figure 8:
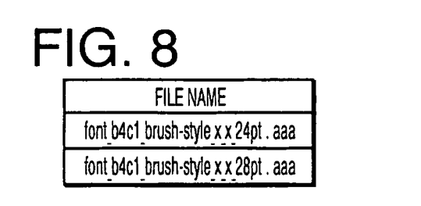
FIG. 8 is a table showing an image data list transmitted by the optical media playback device.
Figure 9:
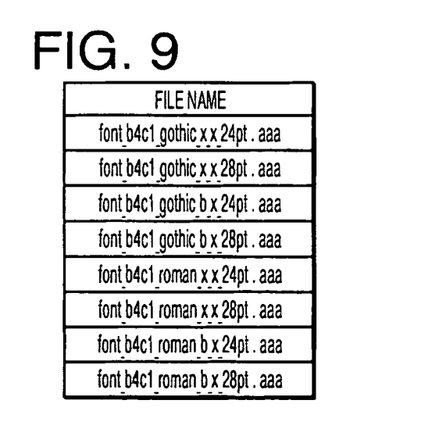
FIG. 9 is a table showing an image data list transmitted by each PC.

Each search query (Q1-Q3 shown in FIG. 5) broadcasted in the step S130 can include "font_b4c1_gothic_b_i_10pt.aaa", for example, when one of the character codes is "b4c1", the typeface is "Gothic", the character size is "10 pt", and the character is enhanced both in boldface and italics. Under the aforementioned assumption about the print data in this embodiment, the search query regarding the kanji character specified by the character code "b4c1" is assumed to be "font_b4c1_brush-style_x_x_30pt.aaa". However, in this embodiment, when no device connected to the network system 1 is capable of supplying a printer font perfectly matching the font information contained in the print data in a font selection process which will be explained later (see FIG. 10), a printer font that is approximate to the perfectly matching printer font is selected (see S270 and S280 in FIG. 10), a prescribed deformation process is executed to the selected printer font (S180), and thereafter the printing process (S190) is executed. More specifically, the search query to be broadcasted is generated not to include all the information contained in the print data but to include part of the information as shown in FIG. 6 (only the character code is specified in the search query) in order to prevent the printing of characters that are unrecognizable to the user and to obtain a printout that is the most approximate to the requested style.

Thus, a search query specifying the character code only is transmitted to the MFP 20 (search query Q1 in FIG. 5), to the optical media playback device 50 (search query Q2 in FIG. 5), and to each PC 40 (search query Q3 in FIG. 5) in the step S130.

Meanwhile, the MFP 20, having the printer fonts in the unique (special-purpose) format (with the filename extension "bbb") stored in the flash memory 31 as mentioned above, judges whether or not it is capable of supplying a printer font (image data) matching the search query by means of the conversion into the format with the filename extension "aaa". If the MFP 20 is capable of supplying a printer font (image data) matching the search query, the MFP 20 generates a list of image data (with the filename extension "aaa" after the conversion) satisfying the condition and transmits the generated list to the printer 10 as an image data list L1 (see FIG. 7) (S140).

Meanwhile, the optical media playback device 50 receiving the search query Q2 judges whether it is capable of supplying a printer font (as image data) matching the condition specified by the search query Q2 or not. If the optical media playback device 50 is capable of supplying a printer font matching the condition, that is, if an optical medium storing a printer font matching the condition (see FIG. 3) has been set in the optical media reading unit 57 and the printer font can be read out from the optical medium, the optical media playback device 50 generates a list of image data satisfying the condition and transmits the generated list to the printer 10 as an image data list L2 (see FIG. 8) (S142).

Each PC 40 also executes a similar process based on a judgment similar to the above judgment by the optical media playback device 50. Specifically, when a printer font matching the search query Q3 has been stored in the HDD 47 of the PC 40 as image data, an image data list L3 (see FIG. 9) is transmitted from the PC 40 to the printer 10 (S144).

Subsequently, the printer 10 receiving the image data lists L1-L3 executes the aforementioned font selection process shown in FIG. 10 (S150). The font selection process is a process for selecting the optimum printer font (optimum for the printing of the print data transmitted from the PC 40) from the image data lists L1-L3 received by the printer 10. In the following explanation, the general outline of the font selection process will be described first and thereafter a particular font selection process for the aforementioned particular print data will be described.

Figure 10:
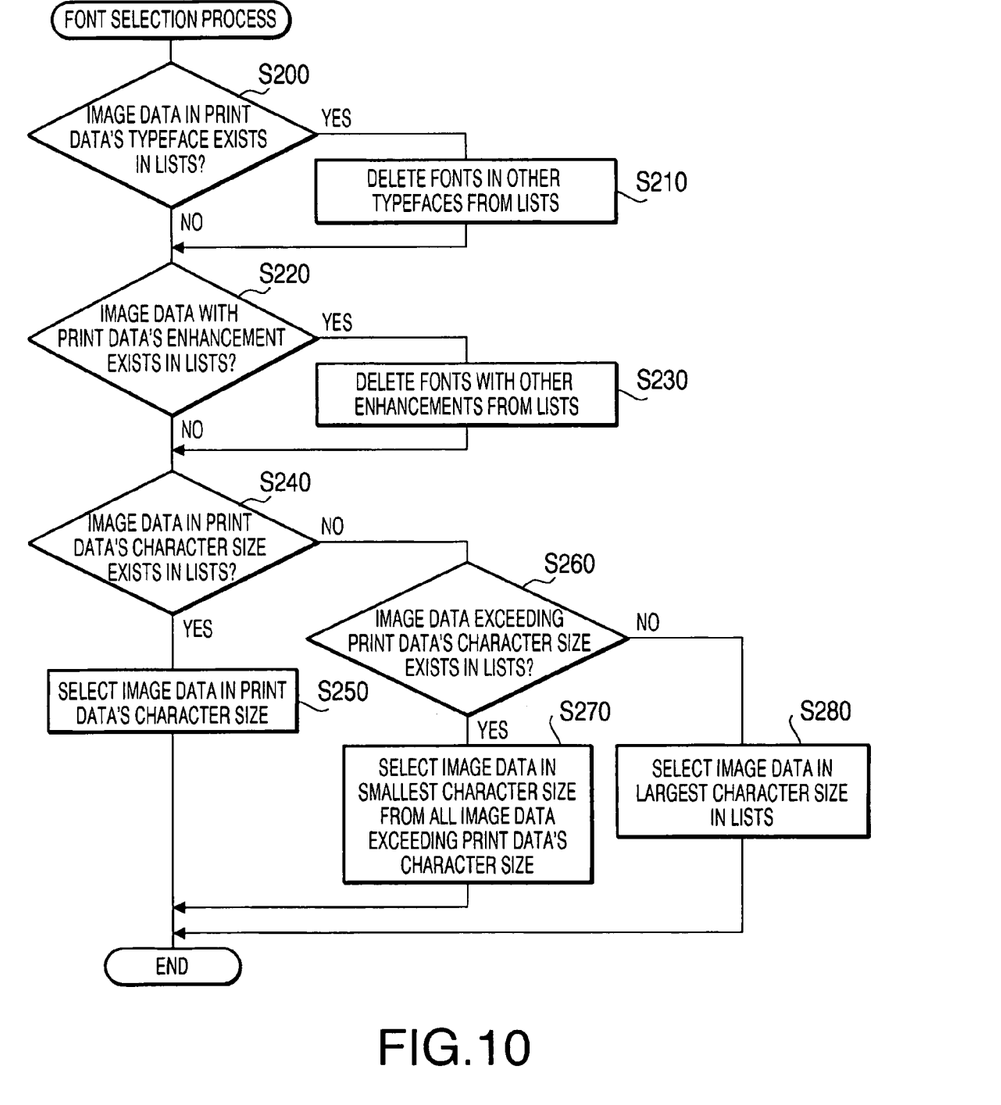
FIG. 10 is a flowchart showing a font selection process executed by the printer.

First, in step S200 in FIG. 10, the printer 10 judges whether or not image data in the same typeface as that specified by the print data exists in the image data lists L1-L3. If image data in the same typeface exists in the image data lists L1-L3 (S200: YES), the printer 10 deletes image data regarding typefaces different from that specified by the print data from the image data lists L1-L3 (S210) and advances to step S220. On the other hand, if image data in the same typeface exists in no image data list L1-L3 (S200: NO), the printer 10 advances to the step S220 without executing the step S210.

In the step S220, the printer 10 judges whether or not image data with the same enhancement (boldface, italic) as that specified by the print data exists in the image data lists L1-L3. The image data lists L1-L3 as the objects of this judgment are part of the original image data lists L1-L3 remaining after the execution of the step S210 (in the case of S200: YES), or all the image data lists L1-L3 transmitted from the MFP 20, the optical media playback device 50 and the PCs 40 in the steps S140, S142 and S144 and received by the printer 10 (in the case of S200: NO).

If image data with the same enhancement (boldface, italic) exists in the image data lists L1-L3 (S220: YES), the printer 10 deletes image data regarding enhancement different from that specified by the print data from the image data lists L1-L3 (S230) and advances to step S240. For example, in cases where no enhancement (boldface, italic) is specified in the image data, the printer 10 judges whether or not image data with no enhancement exists in the image data lists L1-L3 (S220). If image data with no enhancement exists in the image data lists L1-L3 (S220: YES), the printer 10 deletes image data regarding at least either boldface or italic from the image data lists L1-L3 (S230).

On the other hand, if image data with the same enhancement exists in no image data list L1-L3 (S220: NO), the printer 10 advances to the step S240 without executing the step S230. In the step S240, the printer 10 judges whether or not image data in the same character size as that specified by the print data exists in the image data lists L1-L3. The image data lists L1-L3 as the objects of this judgment vary depending on the results of the above judgment steps S200 and S220. For example, when the judgments of S200 and S220 are both "NO", the objects of the judgment of S240 are all the image data lists L1-L3 transmitted from the MFP 20, the optical media playback device 50 and the PCs 40 in the steps S140, S142 and S144 and received by the printer 10. If image data in the same character size exists in the image data lists L1-L3 (S240: YES), the printer 10 selects the image data in the same character size (S250) and ends the font selection process of FIG. 10.

On the other hand, if image data in the same character size exists in no image data list L1-L3 (S240: NO), the printer 10 judges whether or not image data in a character size larger than that specified by the print data exists in the image data lists L1-L3 (S260). If image data in a larger character size exists in the image data lists L1-L3 (S260: YES), the printer 10 selects a piece of image data in the smallest character size from all the image data satisfying the condition of S260 (S270) and ends the font selection process of FIG. 10.

On the other hand, if image data in a larger character size exists in no image data list L1-L3 (S260: NO), the printer 10 selects a piece of image data in the largest character size from all the image data in the image data lists L1-L3 as the objects of the judgment (S280), ends the font selection process of FIG. 10, and advances to step S160 in FIG. 5.

Incidentally, in cases where two or more pieces of image data satisfying each condition are found in the step S250, S270 or S280 (for example, when image data satisfying the condition of the step S240 is found in all the image data lists L1-L3), the printer 10 may select a piece of image data from a particular one of the image data lists L1-L3. Such a configuration is desirable since the amount of data communication among the printer 10, the MFP 20, the PCs 40 and the optical media playback device 50 in the step S160 and step S170 explained later (see FIG. 5) can be reduced. It is possible for the printer 10 to reduce the time necessary for the printing by selecting an appropriate one of the image data lists L1-L3 in consideration of the length of the time for image data transmission to the printer 10 from each of the devices 20, 40 and 50, for example.

Next, the font selection process implemented by the above steps will be explained in more detail taking the aforementioned case (where the printing of the two kanji characters specified by the character codes "b4c1" and "bbfa" in the typeface "brush-style", in the character size "30 pt", and not in boldface or italics (no enhancement: "x") is specified by the print data) as an example. Incidentally, in the following explanation, only a font selection process for the first kanji character specified by the character code "b4c1" will be described (omitting a font selection process for the second kanji character specified by the character code "bbfa") since the two processes are equivalent to each other.

Referring again to FIG. 10, the first judgment of the step S200 results in "YES" (S200: YES) since the image data list L2 (see FIG. 8) includes image data having a filename element "brush-style" (representing the typeface "brush-style" as shown in FIG. 3), by which the process advances to the step S210.

In the step S210, image data not having the filename element "brush-style" are deleted from the image data lists L1-L3. Since no image data to be handled in the font selection process remains in the image data lists L1 and L3 after the deletion, the following steps from S220 are executed in regard to the image data list L2 only.

The judgment of the step S220 (regarding the character enhancement) made for the image data list L2 results in "NO" since the aforementioned particular print data specifies no character enhancement (boldface, italic) (S220: NO), by which the process advances to the step S240.

The judgment of the step S240 (regarding the equality of the character size with that specified by the print data) results in "NO" since the character sizes "24 pt" and "28 pt" of the image data in the image data list L2 (see FIG. 8) differ from "30 pt" specified by the print data (S240: NO), by which the process advances to the step S260.

The judgment of the step S260 (regarding the presence of image data in a character size larger than that specified by the print data) results in "NO" since the character sizes "24 pt" and "28 pt" of the image data in the image data list L2 (see FIG. 8) are smaller than "30 pt" specified by the print data (S260: NO), by which the process advances to the step S280.

In the step S280 for selecting image data in a character size closest to that specified by the print data, a file name "font_b4c1_brush-style_x_x_28pt.aaa" is selected from the image data list L2. Thereafter, the font selection process of FIG. 10 is ended (actually, after the execution of the font selection process for the second kanji character, for which the explanation is omitted), and the process advances to the step S160 in FIG. 5.

While the file name "font_b4c1_brush-style_x_x_28pt.aaa" was finally selected in the step S280 in the above example due to the assumption that the character size "30 pt" is specified by the print data, a different file name "font_b4c1_brush-style_x_x_24pt.aaa" is finally selected in the step S270 when a different character size "22 pt" is specified by the print data, for example. When a character size "28 pt" is specified by the print data, a file name "font_b4c1_brush-style_x_x_28pt.aaa" is finally selected in the step S250.

After finishing the above font selection process (S150 in FIG. 5), the printer 10 in the step S160 in FIG. 5 transmits a transmission request (requesting transmission of the image data file selected in the step S250, S270 or S280 in the font selection process) to the device 20, 40 or 50 in the network system 1 that supplied the image data list including the selected image data file in the aforementioned step S140, S142 or S144.

Since the image data file "font_b4c1_brush-style_x_x_28pt.aaa" in the image data list L2 (see FIG. 8) is finally selected in this embodiment as explained above, the transmission request (image data request) is transmitted to the optical media playback device 50 (image data request R2 in FIG. 5). In FIG. 5, the broken lines representing transmissions of image data requests R1 and R3 indicate that such transmissions can also occur depending on the conditions (ditto for other broken lines in FIG. 5).

In response to the image data request issued by the printer 10 in S160, corresponding image data is transmitted from the optical media playback device 50 to the printer 10 (S170). The printer 10 receiving the image data advances to step S180. Incidentally, in cases where the image data request R1 is issued by the printer 10 to the MFP 20 in the step S160, the MFP 20 executes the aforementioned conversion process and transmits image data obtained by the conversion to the printer 10 in the step S170.

In the step S180, the printer 10 first checks how the image data requested in S160 was selected in the font selection process of S150. Specifically, the printer 10 checks whether the image data was selected in the step S250 or selected in the step S270 or S280. If the image data was selected in S250, it means that the selected image data (printer font) is font data in the same character size as that specified by the print data. In this case, the printer 10 jumps to step S190 (without executing the step S180) when it executes no approximation regarding the character enhancement (explained later).

Figure 11:
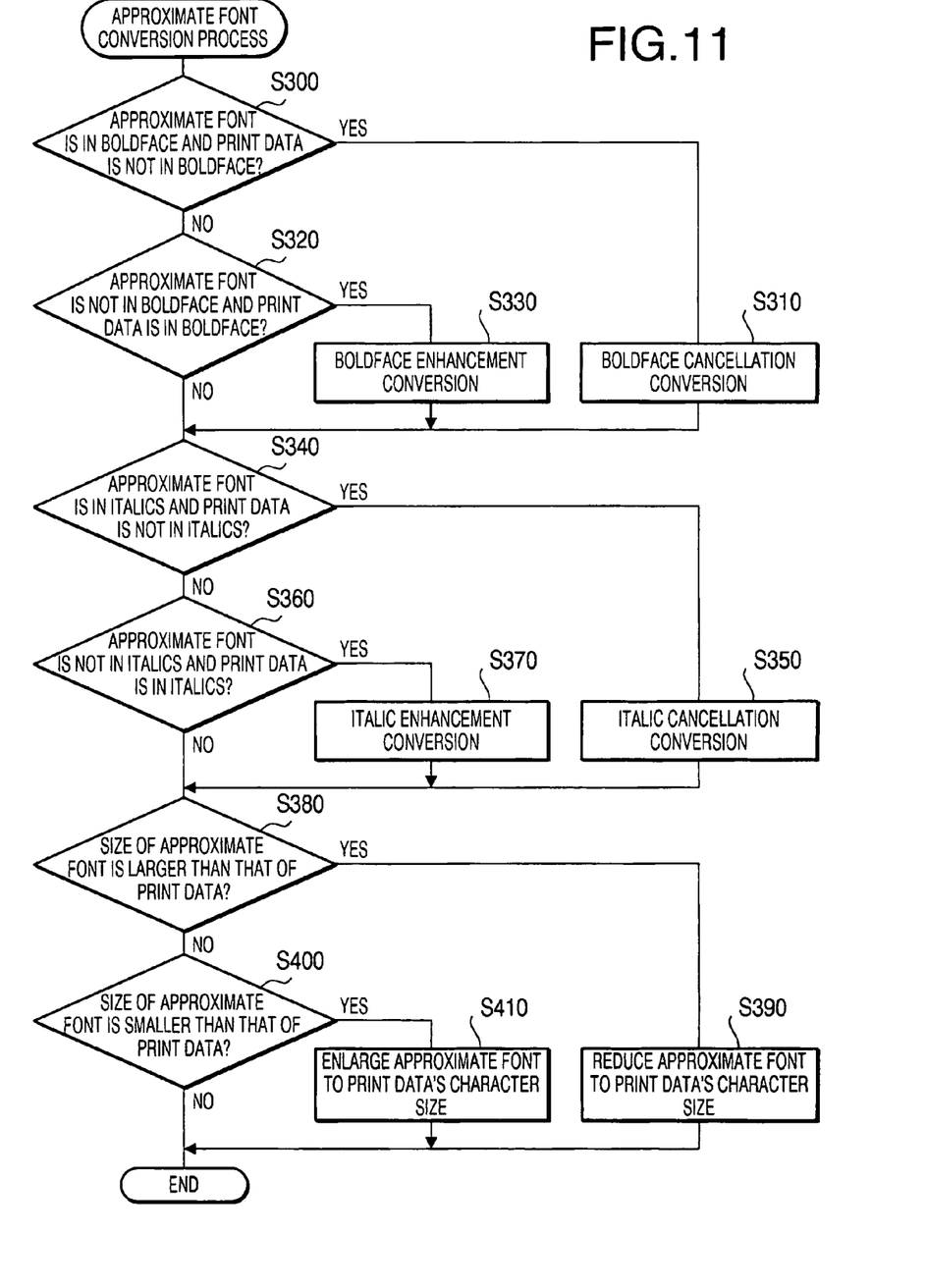
FIG. 11 is a flowchart showing an approximate font conversion process executed by the printer.

Meanwhile, if the image data was selected in S270, it means that the selected image data (printer font) is font data in a character size larger than that specified by the print data (S380 in FIG. 11: YES). In this case, the printer 10 in the step S180 executes a process for reducing the size of the printer font (image data) by a proper scaling factor (see S390 in FIG. 11).

If the image data was selected in S280, it means that the selected image data (printer font) is font data in a character size smaller than that specified by the print data (S400 in FIG. 11: YES). In this case, the printer 10 in the step S180 executes a process for enlarging the printer font (image data) by a proper scaling factor (see S410 in FIG. 11).

Incidentally, such "approximate font conversion" can be employed not only for the character size (as above) but also for the character enhancement in a similar manner. For example, when the image data selected in the step S250, S270 or S280 is with no enhancement (boldface, italic) even though the print data specifies boldface (S320 in FIG. 11: YES), the printer 10 executes a boldface enhancement conversion process (horizontally thickening each part of the character by a factor 1.6, for example) to the image data selected in S250, S270 or S280 (see S330 in FIG. 11).

On the other hand, when the image data selected in S250, S270 or S280 is in italics (with enhancement) even though the print data specifies no enhancement (S340 in FIG. 11: YES), the printer 10 executes an italic cancellation conversion process (properly shifting each part of the image leftward so that the shift width increases with the increase of height (with a shift angle of 14 degrees, for example)) to the image data selected in S250, S270 or S280 (see S350 in FIG. 11).

FIG. 11 is a flowchart showing an example of the approximate font conversion process executed in the aforementioned step S180 in FIG. 5. In FIG. 11, a "boldface cancellation conversion process" is a process for horizontally thinning each part of the character by a factor 0.6, for example. An "italic enhancement conversion process" is a process for properly shifting each part of the image rightward so that the shift width increases with the increase of height (with a shift angle of 14 degrees, for example).

Finally, the printer 10 (printing unit 17) prints out the two kanji characters (of the character codes "b4c1" and "bbfa") specified by the print data by use of the printer fonts (image data) obtained by the above steps (S190).

Incidentally, the communication of the steps S160 and S170 is executed twice for the two kanji characters. While the printer 10 executes the communication of S160 and S170 with the optical media playback device 50 only (since the optical media playback device 50 has the image data (printer fonts) of both kanji characters as shown in FIG. 3) in this embodiment, the printer 10 can execute the communication of S160 and S170 with two different devices for the two kanji characters when the image data (printer fonts) of the kanji characters have to be obtained from more than one device.

While a case where the print instruction from a PC 40 is issued to the printer 10 has been described in the above first embodiment, the first embodiment is applicable also to cases where the print instruction is issued to the MFP 20. In such cases, the above processes (executed by the printer 10 in the above embodiment) are executed by the MFP 20 and thereafter the printing of the print data is executed by the printing unit 27.

It is desirable to configure the MFP 20 to store information on whether each of the network devices connected to the network system 1 has image data regarding printer fonts or not in the flash memory 31 and to transmit the search query only to network devices having such image data regarding printer fonts in the step S130 based on the information. In this case, the printer 10 having no printer font transmits no image data list or image data to the MFP 20 in response to the query from the MFP 20, for example. With such a configuration, unnecessary data (packet) transmission in the network system 1 can be eliminated and the traffic load on the network system 1 can be reduced.

Second Embodiment

Figure 12:
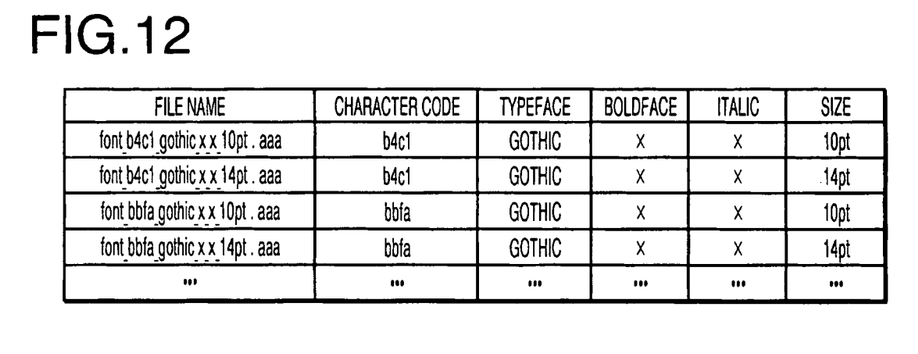
FIG. 12 is a table for explaining printer fonts stored in a flash memory of a printer included in a network system in accordance with a second embodiment of the present invention.

In the following, a network system 1 in accordance with a second embodiment of the present invention will be described referring to FIGS. 12 and 13. The network system 1 of the second embodiment has basically the same configuration as that of the first embodiment, except that a printing device receiving print data and executing printing according to the print data (assumed here to be the printer 10 in FIG. 1) has also stored printer fonts therein. Thus, the following description will be given mainly on the difference from the first embodiment, omitting repeated description of other elements in common with the first embodiment.

The printer 10 in the second embodiment has stored the printer fonts in its own internal flash memory. As shown in FIG. 12, the printer fonts stored in the flash memory of the printer 10 in the second embodiment are image data in the aforementioned particular format (with the filename extension "aaa") that can be shared and handled in the network system 1. Detailed explanation of FIG. 12 is omitted here since its table structure is the same as that of FIGS. 2-4.

A process which is executed by the network system 1 of the second embodiment will be described below referring again to FIG. 5. The process in the second embodiment is basically identical with the process in the first embodiment (FIG. 5) except for part of the steps S120-S160, and thus only the difference from the first embodiment will be described below.

First, in the step S120, the printer 10 judges whether each of the printer fonts judged to be necessary in S110 has been stored in its own flash memory or not. If the necessary printer font has been stored in its own flash memory (S120: YES), the printer 10 executes the printing process (S190) by use of the printer font stored in its own flash memory. If the necessary printer font has not been stored in its own flash memory (S120: NO), the printer 10 advances to step S130.

In the step S130, the printer 10 first judges whether the printer fonts stored in its own flash memory (see FIG. 12) include image data regarding the same character code (character code specified by the print data) or not. If image data regarding the same character code is included in its own printer fonts, the printer 10 generates a list of image data satisfying the condition as shown in FIG. 13. Incidentally, the printer 10 broadcasts the search query (see FIG. 6) to the devices 20, 40 and 50 in the step S130 and receives the image data lists L1-L3 from the devices 20, 40 and 50 in the steps S140-S144 similarly to the first embodiment.

Figure 13:
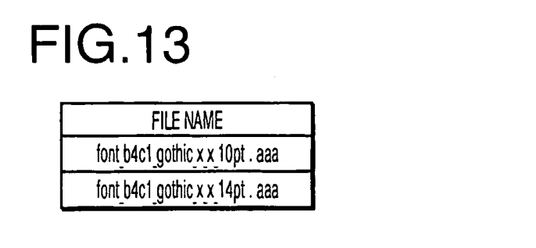
FIG. 13 is a table showing an image data list generated by the printer in the second embodiment.

In step S150, the printer 10 executes the font selection process (see FIG. 10) also using the image data list of FIG. 13 generated in the step S130. When image data (printer font) stored in the printer 10 is finally selected in the font selection process (S150), the printer 10 executes the steps from S180 without executing the step S160. On the other hand, when image data (printer font) stored in a device (20, 40 or 50) other than the printer 10 is finally selected in the font selection process (S150), the printer 10 executes the following steps in the same way as the first embodiment.

Incidentally, while a case where the print instruction from a PC 40 is issued to the printer 10 has been described in the above second embodiment, the second embodiment is applicable also to cases where the print instruction is issued to the MFP 20. Specifically, the printer 10 in the second embodiment has stored printer fonts (image data) in the format that can be shared and handled in the network system 1 in its own flash memory, and thus the printer 10 is capable of sending back an image data list to the MFP 20 when a search query like the one shown in FIG. 6 is received from the MFP 20.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

What is claimed is:

1. A network system in which a plurality of network devices including a printing device are connected together for communication with one another and the network devices are configured for sharing and handling image data in a particular format held by at least one of the network devices, wherein:
the printing device comprises:
a print instruction receiving unit configured to receive print data containing font information from another network device of the plurality of network devices;
a query transmitting unit configured to transmit a supply query to other network devices in the plurality of network devices, the supply query inquiring whether or not each network device is capable of supplying an identical printer font which is identical to a printer font regarding the font information contained in the print data as image data in the particular format and inquiring whether or not each network device is capable of supplying a similar printer font which contains a same character code as, and is similar to, but not identical to, the printer font regarding the font information contained in the print data;
a response receiving unit configured to receive an affirmative response transmitted from one or more of said other network devices in response to the supply query, the affirmative response indicating that the supply of the identical printer font or the similar printer font regarding the supply query as image data in the particular format is possible; and
a printing unit configured to print out the print data received by the print instruction receiving unit by use of the image data in the particular format held by at least one of said one or more of said other network devices which transmits the affirmative response, the plurality of network devices other than the printing device comprises:
a query receiving unit configured to receive the supply query transmitted from the printing device;
a font supply judgment unit configured to judge whether it is possible to supply the identical printer font or the similar printer font regarding the supply query as image data in the particular format or not in response to reception of the supply query by the query receiving unit; and
a response transmitting unit configured to transmit the affirmative response to the printing device when the font supply judgment unit judges that it is possible to supply the identical printer font or the similar printer font regarding the supply query as image data in the particular format, wherein:
the supply query includes only a part of the font information, and
when a printer font identical to the printer font regarding the font information is not available, printer font data is created by reforming a shape by applying enhancement or changing a size of the similar printer font.

2. The network system according to claim 1, wherein the printing device further includes:
a font storage unit configured to store printer fonts as image data in the particular format; and
a font storage judgment unit configured to judge whether or not the font storage unit has stored the identical printer font or the similar printer font regarding the font information contained in the print data received by the print instruction receiving unit,
wherein the query transmitting unit of the printing device transmits the supply query in response to judgment by the font storage judgment unit that the font storage unit has stored no identical printer font or no similar printer font regarding the font information contained in the print data.

3. The network system according to claim 1, wherein:
at least one of the network devices in the network system further includes a font readout unit capable of reading out printer fonts stored in a storage medium removable from the network device as image data in the particular format; and
the font supply judgment unit of the network device judges that the network device is capable of supplying the identical printer font or the similar printer font regarding the supply query as image data in the particular format if the font readout unit can read out the identical printer font or the similar printer font regarding the supply query that has been stored in the removable storage medium as image data in the particular format.

4. The network system according to claim 1, wherein the printing device further comprises:
a font storage unit configured to store printer fonts as image data in the particular format; and
a font storage judgment unit configured to judge whether or not the font storage unit has stored identical printer font regarding the font information contained in the print data received by the print instruction receiving unit, wherein:
the query transmitting unit of the printing device transmits the supply query in response to judgment by the font storage judgment unit that the font storage unit has not stored identical printer font regarding the font information contained in the print data; and
the printing unit of the printing device executes the printing of the print data received by the print instruction receiving unit by use of the identical printer font regarding the font information when the font storage judgment unit judges that the font storage unit has stored the identical printer font regarding the font information while executing the printing by use of a printer font selected from the printer fonts stored in the font storage unit and printer fonts held by the network devices transmitting the affirmative responses as image data in the particular format when the font storage judgment unit judges that the font storage unit has not stored the identical printer font regarding the font information.

5. The network system according to claim 1, wherein:
the font supply judgment unit of the network device generates a list of printer fonts regarding the supply query that the network device is capable of supplying to the printing device as image data in the particular format when the supply of at least one such printer font is possible;
the response transmitting unit of the network device transmits the list generated by the font supply judgment unit to the printing device together with the affirmative response;
the printing device further comprises a font selection unit configured to select a printer font to be used for the printing of the print data by the printing unit taking the lists transmitted from other network devices into consideration; and
the printing unit of the printing device executes the printing of the print data received by the print instruction receiving unit by use of the printer font selected by the font selection unit.

6. The network system according to claim 1, wherein:
the printing device further comprises a network device information storage unit configured to store network device information indicating whether each of the network devices in the network system holds image data as printer fonts or not; and
the query transmitting unit of the printing device transmits the supply query only to network devices holding image data as printer fonts based on the network device information stored in the network device information storage unit.

7. A network system in which a plurality of network devices including a printing device are connected together for communication with one another,
the printing device comprising:
a print instruction receiving unit configured to receive print data containing font information from another network device of the plurality of network devices;
a query transmitting unit configured to transmit a supply query to other network devices of the plurality of network devices, the supply query inquiring whether or not each network device is capable of supplying an identical printer font which is identical to a printer font regarding the font information contained in the print data as image data in the particular format and inquiring whether or not each network device is capable of supplying a similar printer font which contains a same character code as, and is similar to, but not identical to, the printer font regarding the font information contained in the print data;
a response receiving unit configured to receive responses transmitted from said other network devices in response to transmission of the supply query by the query transmitting unit; and
a printing unit configured to print out the print data received by the print instruction receiving unit by use of the image data in the particular format held by at least one of said one or more of said other network devices which transmits an affirmative response,
at least one of the network devices comprising:
a query receiving unit configured to receive the supply query transmitted from the printing device;
a font supply judgment unit configured to judge whether it is possible to supply the identical printer font or the similar printer font regarding the supply query as image data in the particular format or not in response to reception of the supply query by the query receiving unit;
a response transmitting unit configured to transmit the response to the printing device in response to judgment by the font supply judgment unit, wherein:
the supply query includes only a part of the font information, and
when the identical printer font is not available, printer font data is created by reforming a shape by applying enhancement or changing a size of the similar printer font.

8. A printing device to be connected to a network system, in which a plurality of network devices are connected together and the network devices are configured for sharing and handling image data in a particular format held by at least one of the network devices, the printer device being configured for communicating with the plurality of network devices, the printer device comprising:
a print instruction receiving unit configured to receive print data containing font information from a network device in the network system;

a query transmitting unit configured to transmit a supply query to the network devices in the plurality of network devices, the supply query inquiring whether or not each network device is capable of supplying an identical printer font which is identical to a printer font regarding the font information contained in the print data as image data in the particular format and inquiring whether or not each network device is capable of supplying a similar printer font which contains a same character code as, and is similar to, but not identical to, the printer font regarding the font information contained in the print data;

a response receiving unit configured to receive an affirmative response transmitted from one or more of the network devices in response to the supply query, the affirmative response indicating that the supply of the identical printer font or the similar printer font regarding the supply query as image data in the particular format is possible; and a printing unit configured to print out the print data received by the print instruction receiving unit by use of the image data in the particular format held by at least one of the other network device which transmits the affirmative response, wherein:

the supply query includes only a part of the font information, and when the identical printer font is not available, printer font data is created by reforming a shape by applying enhancement or changing a size of the similar printer font.

9. The printing device according to claim 8, further comprising:

a font storage unit configured to store printer fonts as image data in the particular format; and a font storage judgment unit configured to judge whether or not the font storage unit has stored the identical printer font or the similar printer font regarding the font information contained in the print data received by the print instruction receiving unit, wherein:

the query transmitting unit transmits the supply query in response to judgment by the font storage judgment unit that the font storage unit has stored no identical printer font and no similar printer font regarding the font information contained in the print data.

10. The printing device according to claim 8, further comprising:

a font storage unit configured to store printer fonts as image data in the particular format; and a font storage judgment unit configured to judge whether or not the font storage unit has stored the identical printer font regarding the font information contained in the print data received by the print instruction receiving unit, wherein:

the query transmitting unit transmits the supply query in response to judgment by the font storage judgment unit that the font storage unit has not stored the identical printer font regarding the font information contained in the print data, and the printing unit executes the printing of the print data received by the print instruction receiving unit by use of the identical printer font regarding the font information when the font storage judgment unit judges that the font storage unit has stored the identical printer font regarding the font information while executing the printing by use of a printer font selected from the printer fonts stored in the font storage unit and printer fonts held by the network devices transmitting the affirmative responses as image data in the particular format when the font storage judgment unit judges that the font storage unit has not stored the identical printer font regarding the font information.

11. The printing device according to claim 8, wherein:

the response receiving unit receives a list, indicating printer fonts regarding the supply query that each network device is capable of supplying to the printing device as image data in the particular format, from each network device transmitting the affirmative response;

the printing device further comprises a font selection unit configured to select a printer font to be used for the printing of the print data by the printing unit taking the lists transmitted from network devices into consideration; and the printing unit executes the printing of the print data received by the print instruction receiving unit by use of the printer font selected by the font selection unit.

12. The printing device according to claim 8, further comprising a network device information storage unit configured to store network device information indicating whether each of the network devices in the network system holds image data as printer fonts or not, wherein:

the query transmitting unit transmits the supply query only to network devices holding image data as printer fonts based on the network device information stored in the network device information storage unit.

13. The printing device according to claim 8, further comprising:

a font storage unit configured to store printer fonts as image data in the particular format;

a query receiving unit configured to receive the supply query transmitted from another printing device connected to the network system;

a font supply judgment unit configured to judge whether the font storage unit is capable of supplying the identical printer font regarding the supply query as image data in the particular format and whether or not the font storage unit is capable of supplying the similar printer font regarding the supply query, in response to reception of the supply query by the query receiving unit; and a response transmitting unit configured to transmit the affirmative response to the printing device transmitting the supply query in response to judgment by the font supply judgment unit that the font storage unit is capable of supplying the identical printer font or the similar printer font regarding the supply query as image data in the particular format.

14. A printing device to form a network system in which a plurality of network devices are connected together and the network devices are configured for sharing and handling image data in a particular format held by at least one of the network devices, the printing device comprising:

a font storage unit configured to store printer fonts as image data in the particular format;

a query receiving unit configured to receive a supply query transmitted from another printing device receiving print data containing font information transmitted from a network device of the network system, the supply query inquiring whether or not the printing device is capable of supplying an identical printer font which is identical to a printer font regarding the font information contained in the print data as image data in the particular format and inquiring whether or not the printing device is capable of supplying a similar printer font which contains a same character code as, and is similar to, but not identical to, the printer font regarding the font information contained in the print data;

a font supply judgment unit configured to judge whether it is possible for the font storage unit to supply the identical printer font or similar printer font regarding the supply query as image data in the particular format or not in response to reception of the supply query by the query receiving unit; and a response transmitting unit configured to transmit an affirmative response to said another printing device which transmits the supply query in response to judgment by the font supply judgment unit that it is possible for the font storage unit to supply the identical printer font or the similar printer font regarding the supply query as image data in the particular format, the affirmative response indicating that the supply of the identical printer font or the similar printer font regarding the supply query as image data in the particular format is possible, wherein:

the supply query includes only a part of the font information, and when the identical printer font is not available, printer font data is created by reforming a shape by applying enhancement or changing a size of the similar printer font.

15. A non-transitory computer readable recording medium having computer readable instructions stored thereon, which, when executed by a computer functioning as a printing device connected to a network system in which a plurality of network devices are connected together and the network devices are configured for sharing and handling image data in a particular format held by at least one of the network devices, causes the computer functioning as a printer device to:

receive print data containing font information from a network device in the network system;

transmit a supply query to the network devices, the supply query inquiring whether or not each network device is capable of supplying an identical printer font which is identical to a printer font regarding the font information contained in the print data as image data in the particular format and inquiring whether or not each network device is capable of supplying a similar printer font which contains a same character code as, and is similar to, but not identical to, the printer font regarding the font information contained in the print data;

receive an affirmative response transmitted from at least one of the network devices in response to the transmitted supply query, the affirmative response indicating that the supply of the identical printer font or the similar printer font regarding the supply query as image data in the particular format is possible; and print out the received print data by using the image data held by said at least one of the network devices which transmits the affirmative response, wherein:

the supply query includes only a part of the font information, and when the identical printer font is not available, printer font data is created by reforming a shape by applying enhancement or changing a size of the similar printer font similar to the printer font regarding the font information.

16. A non-transitory computer readable recording medium having computer readable instructions stored thereon, which, when executed by a computer functioning as a printing device which forms a network system in which a plurality of network devices are connected together and the network devices are configured for sharing and handling image data in a particular format held by at least one of the network devices and includes a font storage unit storing printer fonts as image data in the particular format, causes the computer functioning as a printer device to:

receive a supply query transmitted from another printing device in the network system receiving print data, the supply query inquiring whether or not the printing device is capable of supplying an identical printer font which is identical to a printer font regarding font information contained in the print data as image data in the particular format and inquiring whether or not the printing device is capable of supplying a similar printer font which contains a same character code as, and is similar to, but not identical to, the printer font regarding the font information contained in the print data; judge whether it is possible for the font storage unit to supply the identical printer font or the similar printer font regarding the supply query as image data in the particular format or not in response to reception of the supply query; and transmit an affirmative response to said another printing device transmitting the supply query in response to judgment that it is possible for the font storage unit to supply the identical printer font or the similar printer font regarding the supply query as image data in the particular format, the affirmative response indicating that the supply of the identical printer font or the similar printer font regarding the supply query as image data in the particular format is possible, wherein:

the supply query includes only a part of the font information, and when identical printer font is not available, printer font data is created by reforming a shape by applying enhancement or changing a size of the similar printer font.

* * * * *